Feb. 23, 1954   W. E. LAWHORN   2,669,918
CROSS ROW COTTON CHOPPER
Filed Oct. 2, 1951   3 Sheets-Sheet 1

INVENTOR
WILLIAM E. LAWHORN
BY Emery, Holcombe & Blair
ATTORNEY

Feb. 23, 1954

W. E. LAWHORN 2,669,918

CROSS ROW COTTON CHOPPER

Filed Oct. 2, 1951

INVENTOR
WILLIAM E. LAWHORN

BY *Emery, Holcombe & Blair*

ATTORNEY

Patented Feb. 23, 1954

2,669,918

UNITED STATES PATENT OFFICE 2,669,918

CROSS ROW COTTON CHOPPER

William E. Lawhorn, Osceola, Ark.

Application October 2, 1951, Serial No. 249,295

7 Claims. (Cl. 97—23)

My invention relates to a machine for chopping cotton. The rows in which cotton is planted are raised above the furrows between them, but are not of strictly uniform height with respect to the furrows. In cultivating cotton it is necessary to work transversely of these rows and this presents certain problems. If the plows are fixed to the machine, they go up and down as the wheels of the machine rise out of or drop into the furrows with the result that the depth of the "bite" of the blades is dependent on whether or not the wheels are in a furrow, and has no relationship to the requirements for doing a proper job. Even if the way for the wheels is smoothed out, a fixed height for the plows is impractical due to the differences in height of the hills. If the plow blades are set at a fixed height from the ground, rather than from the machine, they cultivate the furrows as well as the hills. Applicant has, however, found a method of setting the plow blades at a fixed height from the tops of the hills, so that they cut into the earth of the hills a proper distance, without cultivating the furrows, and cut to a uniform depth in both high hills and low ones. This makes possible the machine chopping of cotton, and one of my machines can do the work which hitherto has required thirty to forty men working with hand tools.

A preferred embodiment of my invention is shown in the attached drawings in which.

Like reference characters denote like parts throughout the several views.

Figure 1:
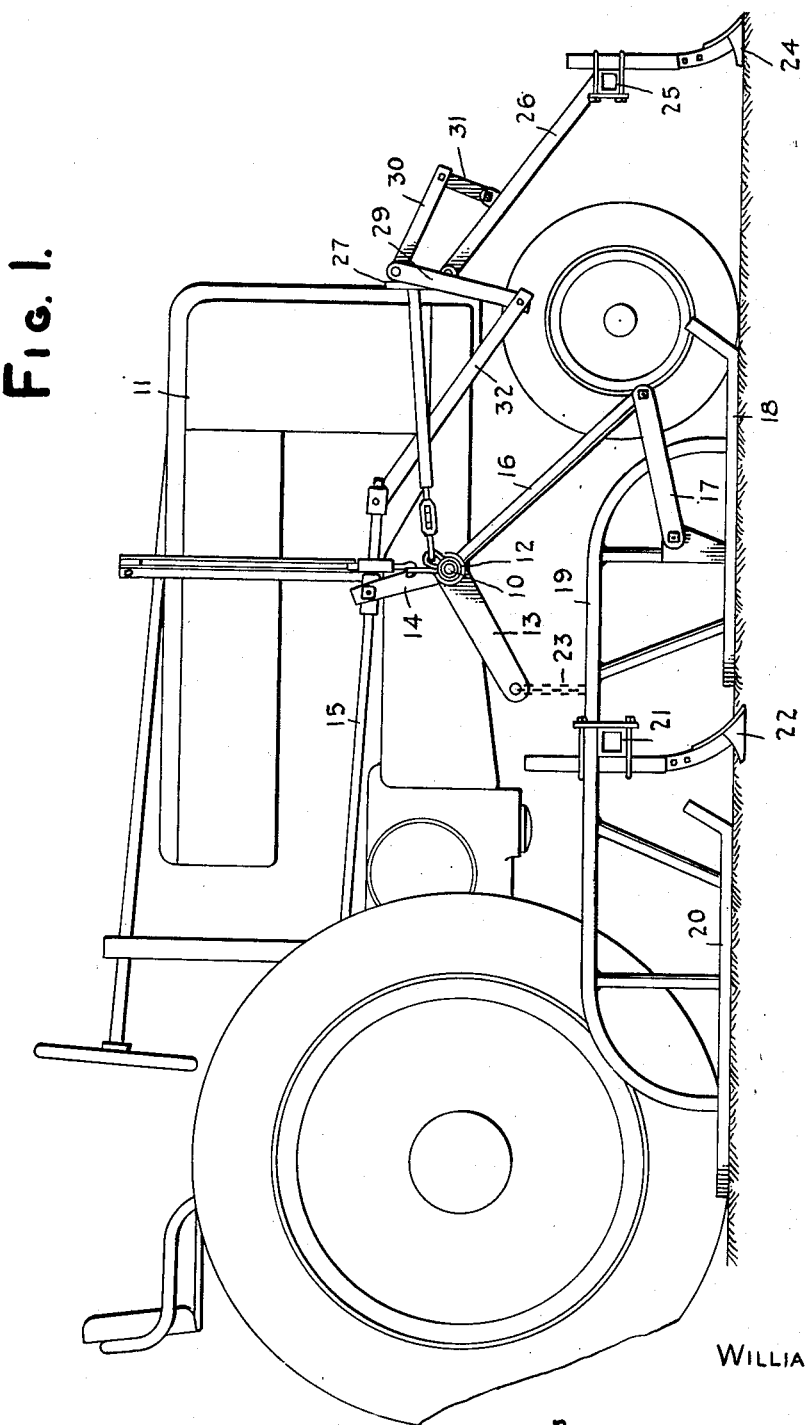
Figure 1 is a side elevation showing my complete attachment in working position on a tractor.
Figure 2:
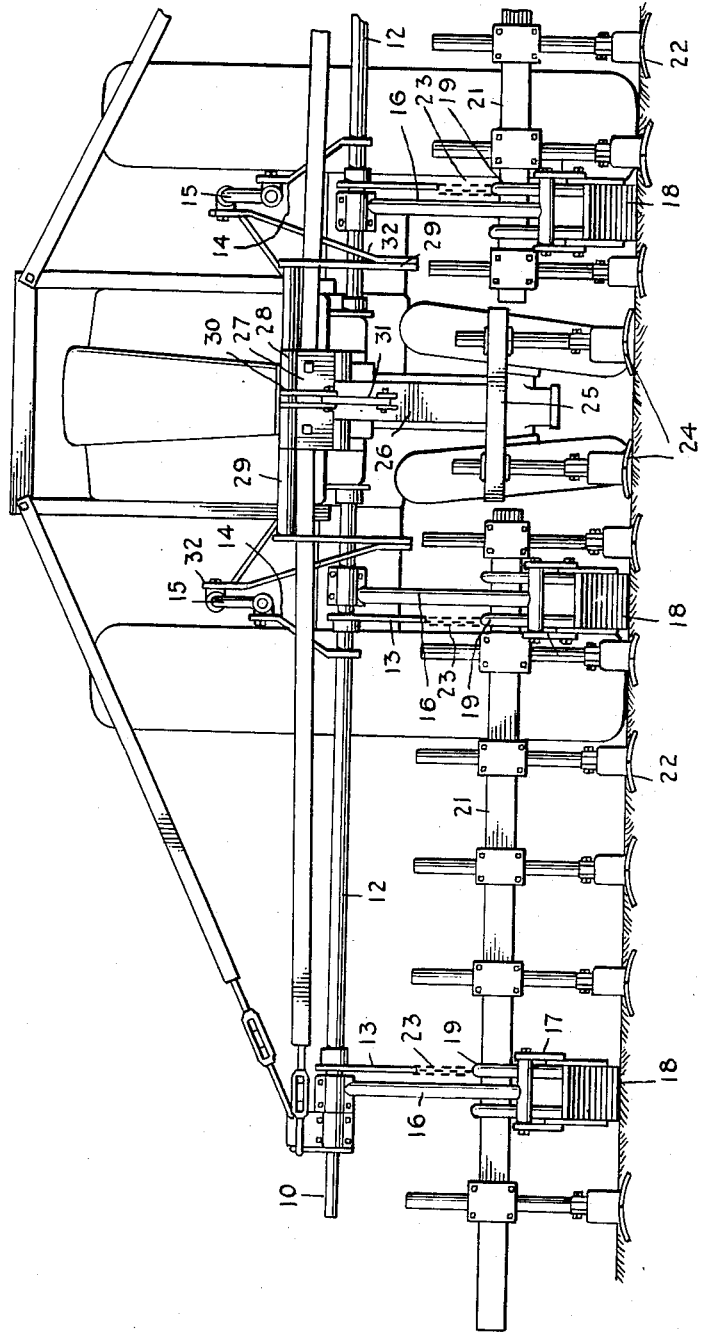
Figure 2 is a partial front elevation showing my new attachment.
Figure 3:
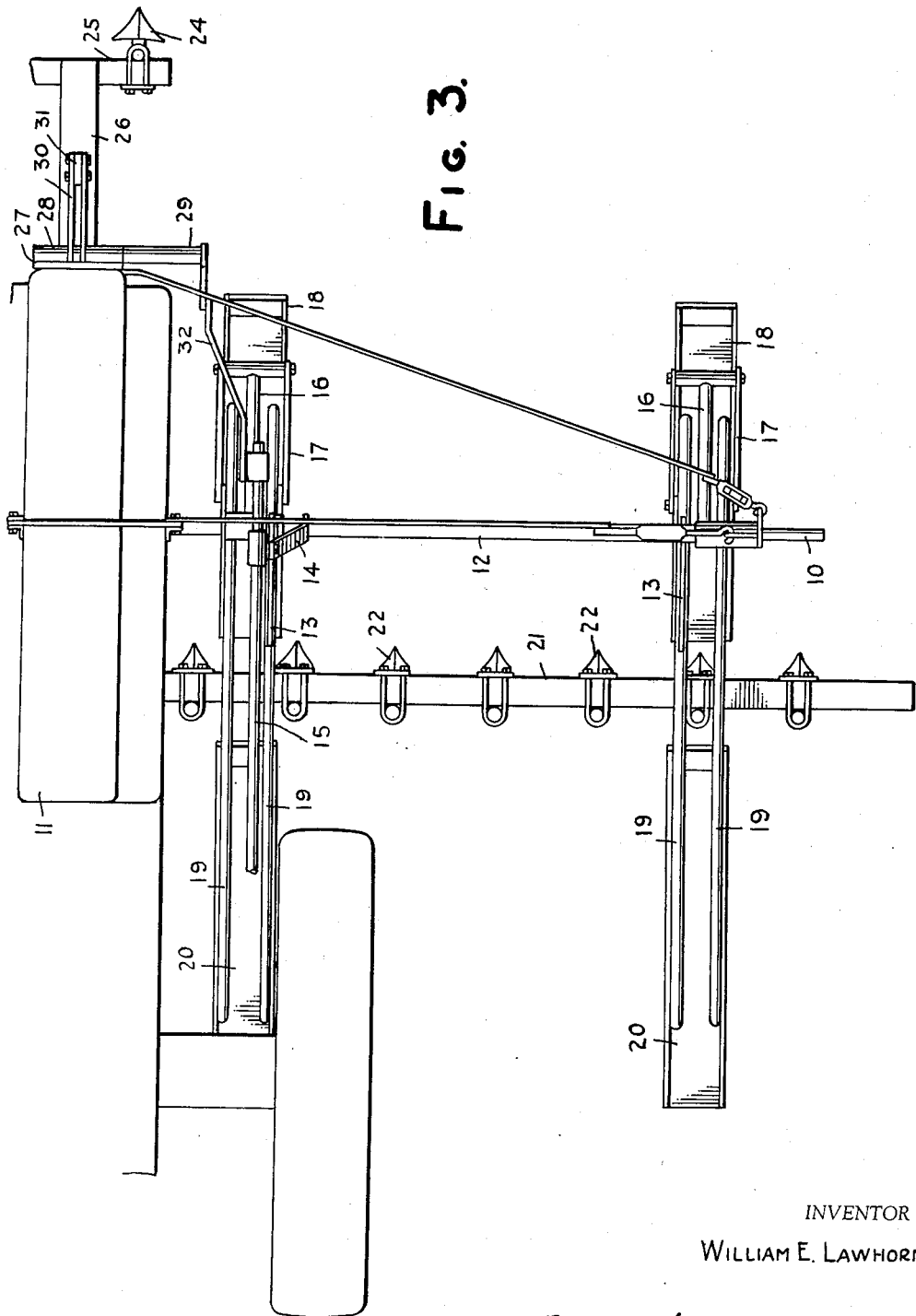
Figure 3 is a partial top plan view of the machine.

My attachment is supported principally from two round horizontal arms 10 fixed to opposite sides of a tractor 11 and extending transversely therefrom. A rotating shell 12 encircles each of these horizontal arms and two lifting arms 13 fixed to each shell extend rearwardly therefrom, parallel to the side of the tractor. An actuating arm 14 also fixed to each shell 12 extends upwardly therefrom and is pivotally attached at its upper end to a substantially horizontal push rod 15, also parallel to the side of the tractor. It will thus be seen that if the push rod 15 is forced forward or backward, the vertical arm 14 will turn the shell 12 about the bar 10 and thereby raise or lower the outer ends of the arms 13. T shaped pivot bars 16 are adjustably fixed to the bar 10 and project downwardly and forwardly therefrom. A pair of link members 17 are pivotally attached at their forward ends to the arms of each T shaped rod and at their rearward ends to forward runner frames 18. These forward runner frames 18 are rigidly attached through connecting bar 19 to rear runner frames 20. The connecting bar passes between the two link members 17 and these link members serve to prevent substantial lateral displacement of the runner assembly, since whenever this begins to turn out of line the connecting arm is forced against one of the link members, which acts as a stop. A transverse horizontal mounting rod 21 is fixed to the fronts of the rear runner frames and carries plow blades 22 extending below the bottoms of the runner frames. A chain 23 runs from the rear end of each arm 13 to the connecting bar 19. Since the runner assembly is so long that it extends over more than one hill, the plough blades are kept at a uniform depth with respect to the tops of the hills and do not go down into the furrows. The entire runner assembly simply rides up and down with variations in the height of the hills, pivoting about the pivots at the arms of the T members 16, in a knee-action arrangement. When it is necessary to lift the blades to clear the ground, as when travelling from field to field, or in turning, the pusher rod is actuated to lift the rear end of the arms 13, as heretofore described, and the chains 23 attached thereto lift the runner assembly and plow blades clear of the ground.

In order to provide as smooth a ride as possible for the tractor driver, forward plough blades 24 are mounted on a horizontal bar 25 parallel to the front of the tractor, and attached to the tractor by means of a lever 26, fixed at its forward end to the horizontal bar 25 and pivotally attached at its rearward end to a plate 27, fixed to the front of the tractor. This plate also carries horizontal journals 28 for double-ended crank 29. A lifting arm 30, fixed to the center of the double-ended crank 29 projects forwardly from the plate and carries at its end a vertical link 31, pivotally attached at its upper end to the lifting arm 30, and at its lower end to the lever 26. Connecting rods 32 are fixed at their rear ends to push rod 15 and pivoted at their forward ends to the crank 29, so that force applied to rod 15 forces the front end of the connecting rods forward, thereby turning the crank and lifting the forward plough blades.

These forward plough blades smooth the path for the front tractor wheels and certain of the cultivating blades associated with the runner assembly are so positioned as to perform the same service for the rear wheels.

It will be appreciated that I have merely described one form which my invention may take; various alterations may be made without departing from the basic principles involved. For instance, two or more pivotally joined linking arms might be substituted for the links of the chain 23.

What I claim is:

1. A cross-row cotton chopping attachment for tractors of the type having at least one transverse horizontal implement bar, said attachment comprising a pivot bar adapted to be rigidly attached to said implement bar and projecting forwardly therefrom, a link member pivotally attached to the forward end of said pivot bar and extending rearwardly therefrom, a runner assembly pivotally attached to said link member, said runner assembly being divided into front and rear sections, each section having a broad ground engaging runner disposed in a horizontal plane, and being joined to the other section by an arched connecting member rising well above the plane of said runners, and ground engaging blades mounted on said runner assembly between said front and rear sections, said link member being pivotally attached to said runner assembly at a point substantially below the upper portion of said arched connecting member and rearwardly of its forward end for movement in a vertical plane parallel to that of said connecting member, said link member and connecting member constituting a cooperating pair one member of which pair is formed with parallel arms situated on opposite sides of and closely adjacent to the other member of said pair so that any substantial transverse movement of said runner assembly is prevented by the abutment of said connecting member against said link member.

2. An attachment according to claim 1 in which a plurality of runner assemblies are independently attached to said implement bar through individual link members and pivot bars and are connected together by a transverse arm fixed to the upper portions of their respective connecting rods.

3. An attachment as claimed in claim 2 in which said runner assemblies are vertically and horizontally adjustable on said transverse arm.

4. An attachment as claimed in claim 1 in which said pivot arm consists of two parallel members passing on opposite sides of said arched connecting arm.

5. A cross-row cotton chopping attachment for tractors, said attachment comprising a pivot bar adapted to be rigidly connected at one end to said tractor, a link member pivotally attached to the free end of said pivot bar and extending rearwardly therefrom, a runner assembly pivotally attached to said link member, said runner assembly being divided into front and rear sections, each section having a broad ground engaging runner disposed in a horizontal plane, and being joined to the other section by an arched connecting member rising well above the plane of said runners, and ground engaging blades mounted on said runner assembly between said front and rear sections, said link member being pivotally attached to said runner assembly at a point substantially below the upper portion of said arched connecting member and rearwardly of its forward end for movement in a vertical plane parallel to that of said connecting member, said link member and connecting member constituting a cooperating pair, one member of which pair is formed with parallel arms situated on opposite sides of and closely adjacent to the other member of said pair so that any substantial transverse movement of said runner assembly is prevented by the abutment of said connecting member against said link member, the pivotal connections between said link member and said runner assembly at its one end and said pivot bar at its other end comprising horizontal axles extending transversely with respect to said tractor and journal means engaging said axles at points axially spaced therealong so as to limit said link member to movement in a substantially vertical plane.

6. A cross-row cotton chopping attachment as claimed in claim 5 in which said axles are carried by said runner assembly and said pivot arm and said link member comprises a pair of horizontally spaced parallel arms passing closely on opposite sides of said arched connecting member, each arm carrying at each end journal means for receiving said horizontal axles.

7. An attachment according to claim 5 in which a plurality of runner assemblies are independently attached to said pivot bar through individual link members and are connected together by a transverse arm fixed to the upper portions of their respective connecting rods.

WILLIAM E. LAWHORN.

References Cited in the file of this patent

UNITED STATES PATENTS

| Number | Name | Date |
| --- | --- | --- |
| 1,797,476 | McCain et al. | Mar. 24, 1931 |
| 1,819,679 | Graham | Aug. 18, 1931 |
| 2,505,280 | Ellinghuysen | Apr. 25, 1950 |

FOREIGN PATENTS

| Number | Country | Date |
| --- | --- | --- |
| 943 | Great Britain | of 1873 |
| 2,230 | Great Britain | of 1873 |